United States Patent
Dai et al.

(10) Patent No.: US 8,537,752 B2
(45) Date of Patent: Sep. 17, 2013

(54) INFORMATION MULTIPLEXING METHOD

(75) Inventors: Bo Dai, Shenzhen (CN); Peng Hao, Shenzhen (CN); Chunli Liang, Shenzhen (CN); Guanghui Yu, Shenzhen (CN); Yuqiang Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 299 days.

(21) Appl. No.: 13/057,722

(22) PCT Filed: Jan. 21, 2009

(86) PCT No.: PCT/CN2009/070260
§ 371 (c)(1),
(2), (4) Date: Feb. 4, 2011

(87) PCT Pub. No.: WO2010/015151
PCT Pub. Date: Feb. 11, 2010

(65) Prior Publication Data
US 2011/0149717 A1  Jun. 23, 2011

(30) Foreign Application Priority Data
Aug. 7, 2008  (CN) .......................... 2008 1 0145862

(51) Int. Cl.
*H04W 4/00* (2009.01)

(52) U.S. Cl.
USPC ............................ 370/328; 370/394; 714/748

(58) Field of Classification Search
None
See application file for complete search history.

(56) References Cited

U.S. PATENT DOCUMENTS

| 2005/0213575 A1* | 9/2005 | Shin et al. ..................... 370/389 |
| 2007/0258540 A1 | 11/2007 | Ratasuk et al. |
| 2010/0208709 A1* | 8/2010 | Kim et al. ..................... 370/336 |

FOREIGN PATENT DOCUMENTS

| CN | 1635803 A | 7/2005 |
| CN | 1674715 A | 9/2005 |
| CN | 101340442 A | 1/2009 |
| WO | 2007084065 A2 | 7/2007 |

* cited by examiner

*Primary Examiner* — Bob Phunkulh
(74) *Attorney, Agent, or Firm* — McGarry Bair PC

(57) ABSTRACT

The present invention discloses an information multiplexing method, comprising: coding multiple feedback information according to number of the feedback information and a linear block code sequence, and truncating corresponding coded information according to a target length of the feedback information coded (S302); dividing the truncated coded information into multiple feedback information logic units sequentially, and multiplexing together the multiple feedback information logic units, multiple rank indication information logic units, multiple control information logic units and data information logic units are; wherein the control information logic units, the multiple rank indication information logic units, the data information logic units, and the feedback information logic units contain the same bit number (S304). Transmission of more than two ACK/NACKs is achieved by the present invention and transmission performance of the system is improved.

20 Claims, 7 Drawing Sheets

INFORMATION MULTIPLEXING METHOD

CROSS-REFERENCE TO RELATED APPLICATIONS

This application is a National Phase application of International Application No. PCT/CN2009/070260, filed Jan. 1, 2009, which claims the benefit of Chinese Patent Application No. 200810145862.8, filed Aug. 7, 2008, both of which are incorporated herein by reference in their entirety.

TECHNICAL FIELD

The present invention relates to a communications field, and more specifically relates to an information multiplexing method.

BACKGROUND OF THE INVENTION

FIG. 1 is a schematic diagram of a frame structure under the mode of Time Division Duplex (TDD) of Long Term Evolution (LTE) system. In such frame structure, a radio frame of 10 ms is divided into two half frames, each of which is divided into 10 time slots with respective lengths of 0.5 ms, and two adjacent time slots compose a subframe with a length of 1 ms; wherein a half frame consists of 5 subframes. In Normal Cyclic Prefix (Normal CP), a time slot consists of 7 symbols with a total length of 66.7 us; wherein the CP length of the first symbol is 5.21 us and that of the other 6 symbols are respectively 4.69 us. In Extended Cyclic Prefix (Extended CP), a time slot consists of 6 symbols, and the CP length of each of the symbols is 16.67 us.

In the frame structure of Extended Cyclic Prefix, the configuration of the subframe has the following features:

I. In order to reduce configuration number of uplink/downlink subframes, LTE TDD defines 7 configuration of uplink/downlink (UL/DL) subframe number in a radio frame as shown in table 1. All subframes are classified into 3 types, i.e., uplink subframe, downlink subframe and special subframe. As shown in table 1, in DL/UL configuration 1, subframes with subframe number of 2, 3, 7 or 8 belong to the uplink subframes for uplink transmission, subframes with subframe number of 0, 4, 5 or 9 belong to the downlink subframes for downlink transmission, and subframes with frame number of 1 or 6 are the special subframes; wherein D represents the downlink frame, U represents the uplink frame and S represents the special frame.

II. The special subframe consists of 3 special field, named as Downlink Pilot Time Slot (DwPTS), Guard Period (GP) and Uplink Pilot Time Slot (UpPTS) respectively; wherein DwPTS is used for downlink transmission and the third symbol of it is used for transmitting Primary-Synchronization Channel (P-SCH); GP is Guard Period and no transmission on it; and UpPTS is used for uplink transmission and can transmit signals such as Random Access Channel (RACH) and sounding reference signal.

TABLE 1

| DL/UL config-uration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

III. The previous subframe of the special subframe is fixed to be used for downlink transmission, while the following subframe of the special subframe is fixed to be used for uplink transmission.

In LTE TDD, UE shall transmit the Acknowledgement/Negative Acknowledgement (ACK/NACK) response of the Physical Downlink Shared Channel (PDSCH) data in downlink subframe n on Physical Uplink Control Channel (PUCCH) in uplink subframe (n+k) (k>3) or transmit the ACK/NACK on Physical Uplink Shared Channel (PUSCH) for uplink data transmission in this uplink subframe; wherein the channel index of PUCCH is determined by the number of the lowest Control Channel Element (CCE) used for transmission of the corresponding Physical Downlink Control Channel (PDCCH).

FIG. 2 is a schematic diagram showing the multiplexing of uplink data and uplink control information. The uplink data and uplink control information may be carried in PUSCH; wherein, the uplink control information comprises Channel Quality Indicator (CQI), Precoding Matrix Indicator (PMI), Rank Indication (RI) and ACK/NACK.

In LTE TDD system, for some uplink/downlink subframe configurations, the number of downlink subframe is larger than the uplink subframe, i.e. ACK/NACKs of plural PDSCH subframes need to be feedbacked in one uplink subframe. Table 2 shows a configuration different from that in table 1, wherein, indicating the number of downlink subframes which ACK/NACK response shall be provided corresponding to the uplink subframe. If there are two transport blocks (TB) in the corresponding downlink subframes, the number shown in table 2 should be doubled

TABLE 2 the number of downlink subframes which ACK/NACK response shall be provided corresponding to the uplink subframe

| DL/UL config-uration | Downlink-to-Uplink Switch-point periodicity | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | — | — | 1 | — | 1 | — | — | 1 | — | 1 |
| 1 | | — | — | 2 | 1 | — | — | — | 2 | 1 | — |
| 2 | | — | — | 4 | — | — | — | — | 4 | — | — |
| 3 | 10 ms | — | — | 3 | 2 | 2 | — | — | — | — | — |
| 4 | | — | — | 4 | 4 | — | — | — | — | — | — |
| 5 | | — | — | 9 | — | — | — | — | — | — | — |
| 6 | | — | — | 1 | 1 | 1 | — | — | 1 | 1 | — |

At present, in the existing technologies there are only provided methods for transmitting a single ACK/NACK information and two ACK/NACK information in Physical Uplink Shared Channel (PUSCH), however for methods of transmitting more than two ACK/NACK information, no solutions have been given in the existing technologies.

SUMMARY OF THE INVENTION

Considering the problem in transmitting more than 2 ACK/NACK information in relevant technologies has not been solved, the present invention aims at providing an improved information multiplexing method to settle the above problem.

According to one aspect of the present invention, an information multiplexing method is provided. The information multiplexing method according to the present invention comprises: coding multiple feedback information according to number of the feedback information and a linear block code sequence, and truncating corresponding coded information according to a target length of the feedback information coded; dividing the truncated coded information into multiple feedback information logic units sequentially, and multiplexing together the multiple feedback information logic units, multiple rank indication information logic units, multiple control information logic units and data information logic units; wherein the number of bits in the control information logic unit, the multiple rank indication information logic unit, the data information logic unit, and the feedback information logic unit is the same.

Wherein, the step of coding the multiple feedback information according to number of the feedback information and a linear block code sequence comprises: coding the multiple feedback information according to the number of the feedback information and a length of a basic sequence; or grouping the multiple feedback information; wherein the feedback information of the last group has 2 or 1 bit, while the other groups have 2 bits, and coding each group of the feedback information.

Preferably, the step of coding the multiple feedback information according to number of the feedback information and a length of the basic sequence comprises:

$$b_i = \sum_{n=0}^{O-1} (o_n \cdot M_{i,n}) \bmod 2;$$

wherein i=0, 1, 2, ..., B−1, $b_0, b_1, b_2, b_3, \ldots, b_{B-1}$ represents a coded bit sequence, O represents the number of the feedback information, B represents the length of the basic sequence, $M_{i,n}$ represents value of number i in the basic sequence n, and $o_0, o_1, \ldots, o_{O-1}$ represents the feedback information.

Preferably, the step of truncating the corresponding coded information according to a target length of the feedback information coded comprises: repeating the coded bit to acquire a reference bit; truncating the coded information whose length is the same as the target length of the feedback information coded from the reference bit; or repeating the coded bit to obtain the coded information according to the target length of the feedback information coded.

Wherein, the step of coding each group of the feedback information comprises: when intra-group feedback information is 1 bit, in case that modulation scheme is QPSK, the coded information is $[o_0,x]$; in case that the modulation scheme is 16QAM, the coded information is $[o_0,x,x,x]$; in case that the modulation scheme is 64QAM, the coded information is $[o_0,x,x,x,x,x]$; wherein $o_0$ represents the feedback information; when the intra-group feedback information is 2 bits, in case that the modulation scheme is QPSK, the coded information is $[o_0,o_1,o_2,o_0,o_1,o_2]$; in case that the modulation scheme is 16QAM, the coded information is $[o_0,o_1 x,x, o_2, o_0, x,x, o_1, o_2,x,x]$; in case that the modulation scheme is 64QAM, the coded information is $[o_0,o_1,x,x,x,x, o_2, o_0, x,x, x,x, o_1,o_2,x,x,x,x]$; wherein $o_0,o_1$ represent the feedback information and $o_2=(o_0 \oplus o_1)$, $\oplus$ represents module operations, x represents placeholders for scrambling.

Preferably, the step of dividing the truncated coded information into multiple feedback information logic units sequentially comprises: interleaving the truncated coded information, and sequentially dividing the interleaved information into multiple the feedback information logic units.

Preferably, the step of interleaving the truncated coded information comprises: interleaving the truncated coded information in a manner of row in column out; wherein when the intra-group feedback information is 1 bit, in case that the modulation scheme is QPSK, a length of the column is 2; in case that the modulation scheme is 16QAM, the length of the column is 4; in case that the modulation scheme is 64QAM, the length of the column is 8. When the intra-group feedback information is 2 bits, in case that the modulation scheme is QPSK, the length of the column is 6; in case that the modulation scheme is 16QAM, the length of the column is 12; in case the modulation scheme is 64QAM, the length of the column is 18. Or setting the length of the column to be a fixed value, which comprises one of the followings: 2, 4, 6 or 8.

Wherein, the step of multiplexing together the multiple feedback information logic units, multiple rank indication information logic units, multiple control information logic units and data information logic units comprises:

producing a virtual matrix according to total number of the feedback information logic units, the rank indication information logic units, the control information logic units and the data information logic units;

writing, according to a sequence of writing in rows first and then columns of the virtual matrix, the feedback information logic units and the rank indication information logic units into a reserved position of the virtual matrix from a last row to a first row of the virtual matrix;

writing in, according to the sequence of rows first and then columns, the control information logic units and the data information logic units in due order from a position of the first row and a first column of the virtual matrix; wherein positions in which the feedback information logic units and the rank indication information logic units are written are skipped.

Preferably, the step of writing the multiple feedback information logic units in a reserved position of the matrix comprises:

when Normal Cyclic Prefix is configured for subframe structure, writing the feedback information logic units into matrix columns with column numbers of 2, 3, 8 and 9 in the matrix; when Extended Cyclic Prefix is configured for subframe structure, writing the feedback information logic units in matrix columns with column numbers of 1, 2, 6 and 7 in the matrix; wherein the columns of the matrix are numbered from 0.

Wherein, the step of multiplexing together the multiple feedback information logic units, multiple rank indication information logic units, multiple control information logic units and data information logic units comprises:

producing a virtual matrix according to total number of the feedback information logic units, the rank indication information logic units, the control information logic units and the data information logic units; writing in, according to a sequence of writing in rows first and then columns of the matrix, the rank indication information logic units in a reserved position of the virtual matrix from a last row to a first row of the virtual matrix; writing in, from a position of the first row and a first column of the virtual matrix, according to the sequence of writing in rows first and then columns of the matrix, the control information logic units, the feedback information logic units and the data information logic units in due order; wherein positions in which the feedback information logic units and the rank indication information logic units are written are skipped; or, writing in, according to the sequence of writing in rows first and then columns of the matrix, the feedback information logic units, the control information logic units, and the data information logic units in due order from the position of the first row and the first column of the virtual matrix; wherein positions in which the feedback information logic units and the rank indication information logic units are written are skipped.

Wherein, the step of multiplexing together the multiple feedback information logic units, multiple rank indication information logic units, multiple control information logic units and data information logic units comprises:

producing a virtual matrix according to total number of the rank indication information logic units, the control information logic units and the data information logic units;

writing, according to a sequence of writing in rows first and then columns of the matrix, the rank indication information logic units in a first reserved position of the virtual matrix from a last row to a first row of the virtual matrix;

writing in, according to the sequence of writing in rows first and then columns of the matrix, the control information logic units and the data information logic units in due order from a position of the first row and a first column of the virtual matrix; wherein positions in which the rank indication information logic units are written are skipped; writing, according to the sequence of writing in rows first and then columns of the matrix, the feedback information logic units in a second reserved position of the virtual matrix, and transmitting no other information logic units in the condition that the second reserved position has been occupied by the other information logic units.

Preferably, the step of writing the multiple feedback information logic units in the reserved position of the matrix comprises:

when Normal Cyclic Prefix is configured for subframe structure, writing the feedback information logic units into matrix columns with column numbers of 2, 3, 8 and 9 in the matrix; when Extended Cyclic Prefix is configured for subframe structure, writing the feedback information logic units into matrix columns with column numbers of 1, 2, 6 and 7 in the matrix; wherein the columns of the matrix are numbered from 0, and the writing is performed from the last row to the first row of the matrix.

Preferably, the step of writing the multiple feedback information logic units in the second reserved position of the virtual matrix comprises:

writing in the feedback information logic units from a position where the first data information logic unit is located; or writing in the feedback information logic units from a position where the first control information logic unit is located; wherein the positions in which the rank indication information logic units are written are skipped.

Wherein, when Normal Cyclic Prefix is configured for subframe structure, the number of columns of the matrix is set to be 12; and when Extended Cyclic Prefix is configured for subframe structure, the number of columns of the matrix is set to be 10.

In addition, the above feedback information comprises one of the followings: Acknowledgement and Negative Acknowledgement.

Wherein, the control information logic units, the data information logic units, and the feedback information logic units having the same bit numbers comprises: in case that the modulation scheme is QPSK, the bit number is 2; in case that the modulation scheme is 16QAM, the bit number is 4; in case that the modulation scheme is 64QAM, the bit number is 6.

Wherein, the number of the above multiple feedback information is an integer more than 2.

More than two ACK/NACKs may be transmitted according to at least one of the technical solutions of the present invention, which improves transmission performance of a system.

BRIEF DESCRIPTION OF THE DRAWINGS

The drawings are provided for further understanding of the present invention and constitute a part of the specification. The exemplary embodiments and the drawings are used to explain the present invention without unduly limiting the scope of the present invention, wherein.

DETAILED DESCRIPTION OF THE PREFERRED EMBODIMENTS

Function Description

As stated above, at present no solutions for transmitting more than 2 ACK/NACKs have been provided in the existing technologies. The present embodiment provides an information multiplexing method toward this problem. Transmission of multiple ACK/NACKs in physical uplink shared channel can be achieved by coding multiple ACK/NACKs and writing them in a corresponding matrix for sending. By this way, base station is ensured to receive ACK/NACK of downlink data feedbacked by target users, and system performance can be improved.

The present embodiments will be illustrated in combination with the accompanying drawings in details as follows, and if not conflict, the embodiments and the technical features of the embodiments can be combined.

According to one embodiment, there is provided an information multiplexing method.

Figure 1:
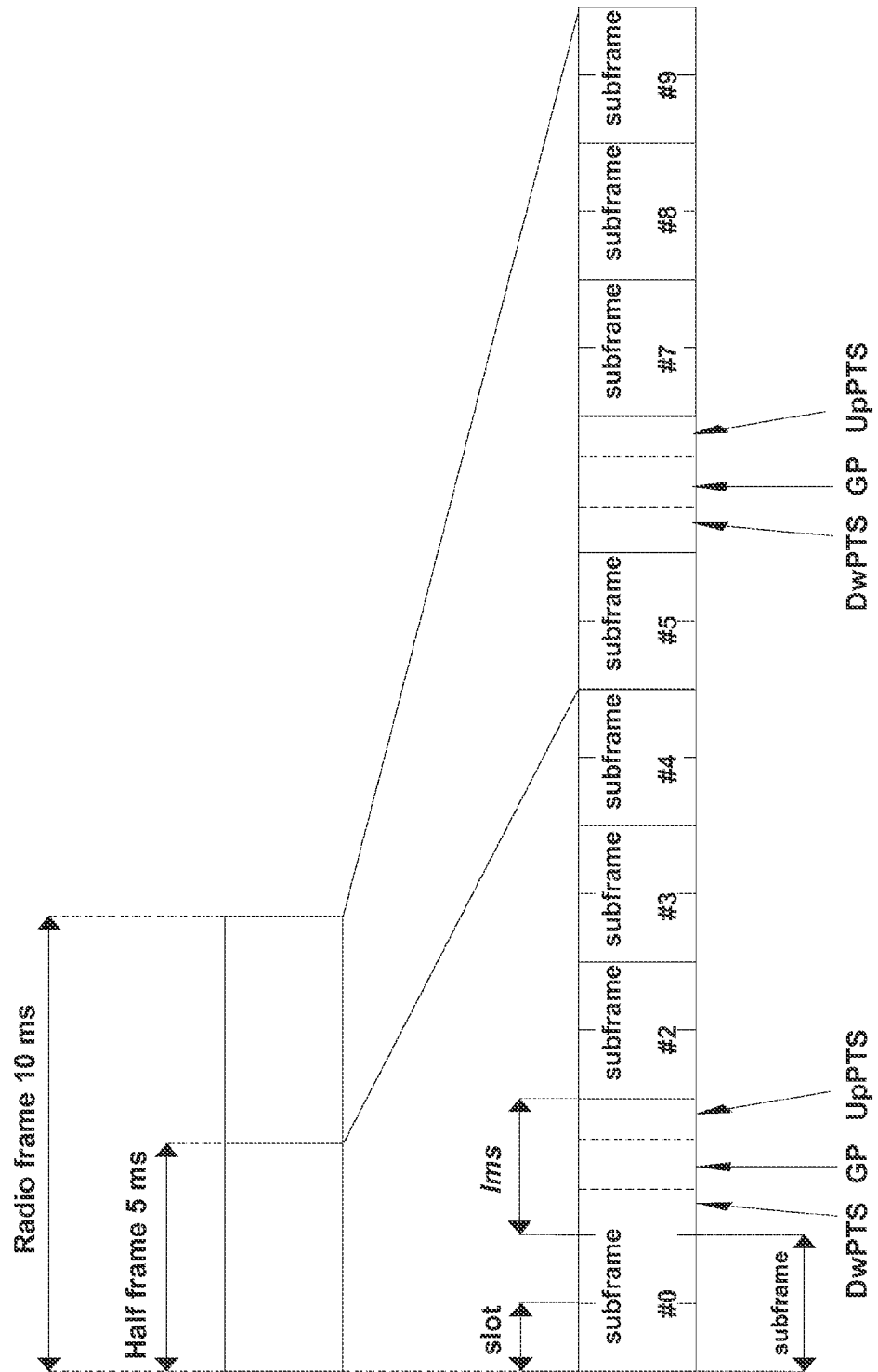
FIG. 1 is a schematic diagram showing the frame structure in TDD mode in LTE system according to relevant technologies.
Figure 2:
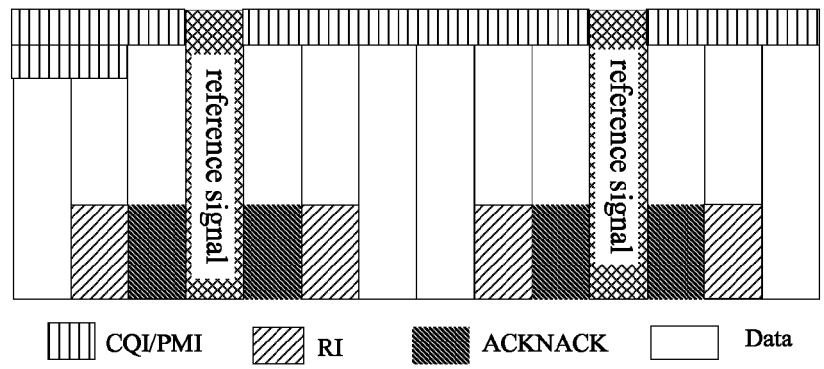
FIG. 2 is a schematic diagram showing the multiplexing method of uplink data and uplink control information according to relevant technologies.
Figure 3:
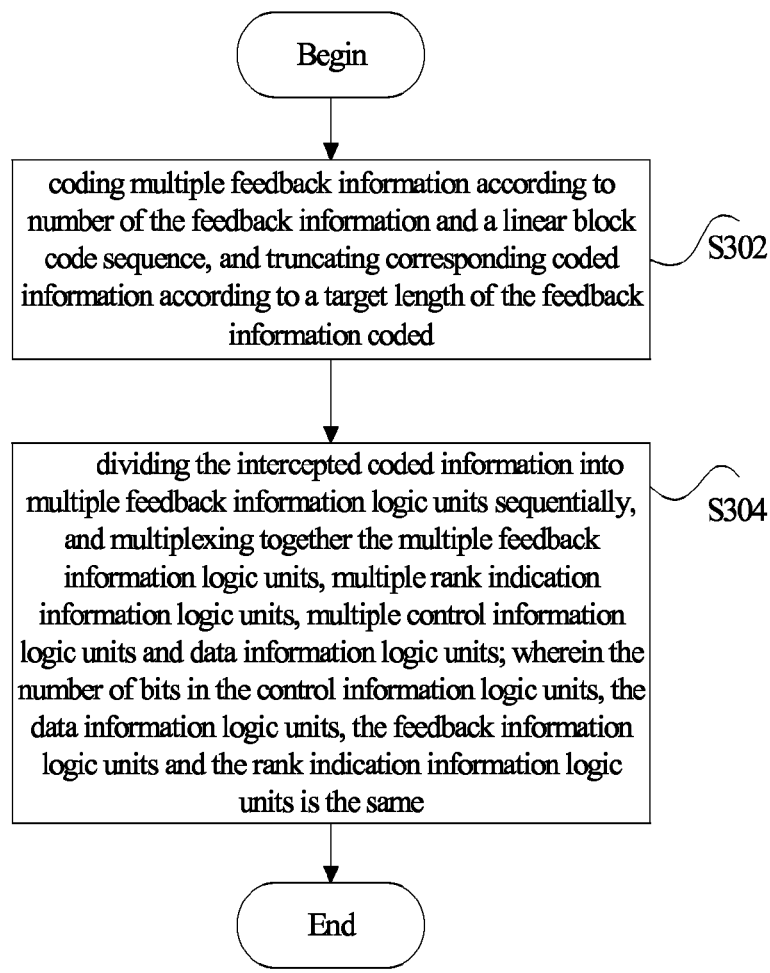
FIG. 3 is a flow chart showing the information multiplexing method according to one embodiment.

FIG. 3 is a flow chart showing the information multiplexing method according to one embodiment. As shown in FIG. 3, the information multiplexing method according to the present embodiment comprises the following steps:

Step 302, coding multiple feedback information according to number of feedback information and a linear block code sequence, and truncating corresponding coded information according to a target length of the feedback information coded.

Step 304, dividing the truncated coded information into multiple feedback information logic units sequentially, and multiplexing together the multiple feedback information logic units, multiple rank indication information logic units, multiple control information logic units and data information logic units; wherein number of bits in the control information logic unit, the data information logic unit, the feedback information logic unit, and the rank indication information logic unit is the same.

Transmission of more than two ACK/NACKs can be achieved according to the embodiments of the present invention to improve transmission performance of the system.

The above processes will be described in details as follows:

(I) in step 302, the coding may be one of the two following methods (method 1 and method 2).

Method 1: the multiple feedback information are coded according to number of the feedback information and a length of a basic sequence. In the present embodiment, the feedback information mentioned comprises ACK and NACK.

Method 2: the multiple feedback information are divided into groups; wherein the feedback information of the last group has 2 or 1 bit, while the other groups have 2 bits and each group of the feedback information is coded separately.

(II) in step 304, the multiplexing may be one of the following three methods (methods 1 to 3).

Method 1: a virtual matrix is produced according to total number of the feedback information logic units, the rank indication information logic units, the control information logic units and the data information logic units; according to a sequence of rows first and then columns, the feedback information logic units and the rank indication information logic units are written into a reserved position of the virtual matrix from a last row to a first row of the virtual matrix; the control information logic units and the data information logic units are written in in due order from a position of the first row and a first column of the virtual matrix according to the sequence of rows first and then columns. The feedback information logic units and the rank indication information logic units are skipped and the writing is continued from a next position.

Method 2: a virtual matrix is produced according to the total number of the feedback information logic units, the rank indication information logic units, the control information logic units and the data information logic units;

According to the sequence of rows first and then columns, the rank indication information logic units are written into a reserved position of the virtual matrix from a last row to a first row of the virtual matrix;

the control information logic units, the feedback information logic units and the data information logic units are written in in due order from a position of the first row and a first column of the virtual matrix according to the sequence of rows first and then columns. The rank indication information logic units are skipped and the writing is continued from the next position. Or according to the sequence of writing in rows first and then columns of the virtual matrix, the feedback information logic units, the control information logic units, and the data information logic units are written in in due order from a position of the first row and a first column of the virtual matrix; wherein positions in which the feedback information logic units and the rank indication information logic units are written are skipped.

Method 3: a virtual matrix is produced according to the total number of the rank indication information logic units, the control information logic units and the data information logic units; the rank indication information logic units are written into a first reserved position of the virtual matrix according to the sequence of rows first and then columns from the last row to the first row of the virtual matrix; the control information logic units and the data information logic units are written in in due order from the position of the first row and first column of the virtual matrix according to the sequence of rows first and then columns. The rank indication information logic units are skipped and the writing is continued from the next position. The feedback information logic units are written in a second reserved position of the virtual matrix in the sequence of rows first and then columns; wherein logic units of other information written in positions occupied by the feedback information logic units are no longer transmitted.

Additionally, preferably, in case that the modulation scheme is QPSK, the bit number of all the above logic units is 2; in case that the modulation scheme is 16QAM, the bit number thereof is 4; in case that the modulation scheme is 64QAM, the bit number thereof is 6.

The present invention will be further illustrated in combination with the preferred embodiments.

Embodiment 1

Figure 4:
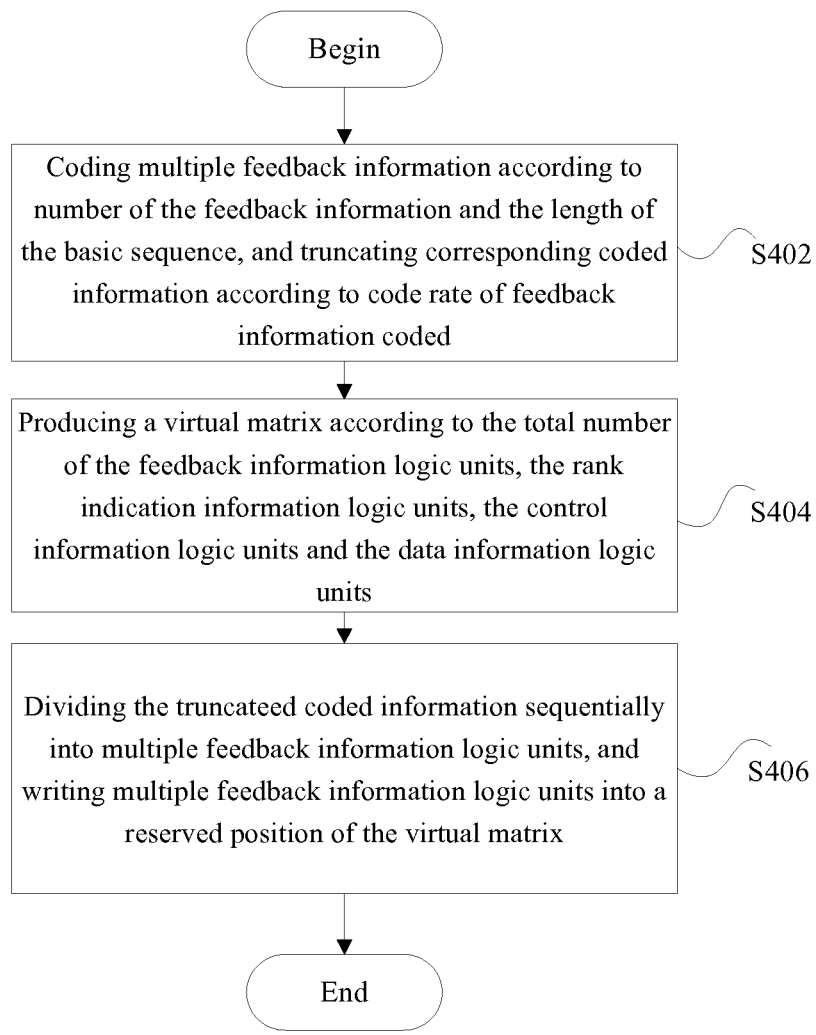
FIG. 4 is a flow chart showing the information multiplexing method according to embodiment 1.

FIG. 4 is a flow chart showing the information multiplexing method according to embodiment 1. As shown in FIG. 4, the information multiplexing method according to the present embodiment comprises the following processes (steps 402 to 406):

Step 402, coding multiple feedback information according to number of the feedback information and the length of the basic sequence, and truncating corresponding coded information according to a target length of the feedback information coded.

Step 404, producing a virtual matrix according to total number of the feedback information logic units, the rank indication information logic units, the control information logic units and the data information logic units.

Step 406, dividing the truncated coded information into multiple feedback information logic units sequentially, and writing the multiple feedback information logic units into a reserved position of the virtual matrix; wherein the control information logic units, the data information logic units, the feedback information logic units, and the rank indication information logic units have the same bit number.

Transmission of more than two ACK/NACKs can be achieved according to the embodiments of the present invention to improve transmission performance of the system.

The above processes will be described in details as follows:

(I) Step 402

The step of truncating the corresponding coded information in step 402 may be carried out as follows:

the encoder is a (B,O) block encoder; wherein B represents the length of basic sequence and O represents the number of the feedback information. The coding method is as follows:

Assume $o_0, o_1, \ldots, o_{O-1}$ and $b_0, b_1, b_2, b_3, \ldots, b_{B-1}$ are the original ACK/NACK feedback bit sequence and coded bit sequence respectively; wherein the coded bits sequence $b_0, b_1, b_2, b_3, \ldots, b_{B-1}$ can be obtained in the following way $$b_i = \sum_{n=0}^{O-1} (o_n \cdot M_{i,n}) \bmod 2,$$

$i=0, 1, 2, \ldots, B-1$, and $M_{i,n}$ represents parameters in the basic sequence.

The present invention is illustrated by taking B=20 and B=32 as examples, but it is not limited within these examples; wherein table 3 shows the basic sequence in the case of B=20, while table 4 shows the basic sequence in the case of B=32.

TABLE 3 basic sequence for (20, O) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0  | 1 | 1 | 0 | 0 | 0 | 0 | 0 | 0 | 0 | 0 | 1 | 1 | 0 |
| 1  | 1 | 1 | 1 | 0 | 0 | 0 | 0 | 0 | 0 | 1 | 1 | 1 | 0 |
| 2  | 1 | 0 | 0 | 1 | 0 | 0 | 1 | 0 | 1 | 1 | 1 | 1 | 1 |
| 3  | 1 | 0 | 1 | 1 | 0 | 0 | 0 | 0 | 1 | 0 | 1 | 1 | 1 |
| 4  | 1 | 1 | 1 | 1 | 0 | 0 | 0 | 1 | 0 | 0 | 1 | 1 | 1 |
| 5  | 1 | 1 | 0 | 0 | 1 | 0 | 1 | 1 | 1 | 0 | 1 | 1 | 1 |
| 6  | 1 | 0 | 1 | 0 | 1 | 0 | 1 | 0 | 1 | 1 | 1 | 1 | 1 |
| 7  | 1 | 0 | 0 | 1 | 1 | 0 | 0 | 1 | 1 | 0 | 1 | 1 | 1 |
| 8  | 1 | 1 | 0 | 1 | 1 | 0 | 0 | 1 | 0 | 1 | 1 | 1 | 1 |
| 9  | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

TABLE 4 basic sequence for (32, O) code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0  | 1 | 1 | 0 | 0 | 0 | 0 | 0 | 0 | 0 | 0 | 1 |
| 1  | 1 | 1 | 1 | 0 | 0 | 0 | 0 | 0 | 0 | 1 | 1 |
| 2  | 1 | 0 | 0 | 1 | 0 | 0 | 1 | 0 | 1 | 1 | 1 |
| 3  | 1 | 0 | 1 | 1 | 0 | 0 | 0 | 0 | 1 | 0 | 1 |
| 4  | 1 | 1 | 1 | 1 | 0 | 0 | 0 | 1 | 0 | 0 | 1 |
| 5  | 1 | 1 | 0 | 0 | 1 | 0 | 1 | 1 | 1 | 0 | 1 |
| 6  | 1 | 0 | 1 | 0 | 1 | 0 | 1 | 0 | 1 | 1 | 1 |
| 7  | 1 | 0 | 0 | 1 | 1 | 0 | 0 | 1 | 1 | 0 | 1 |
| 8  | 1 | 1 | 0 | 1 | 1 | 0 | 0 | 1 | 0 | 1 | 1 |
| 9  | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

The coded bit sequence above is circular repeated, and the coded bit sequence of corresponding length (i.e. the coded information in the above text) is truncated according to the target length of the feedback information coded which is transmitted.

(II) Step 404

After truncating the coded information of corresponding length, the control information and data information are written in different modulation symbols as follows: according to modulation schemes, coded uplink control information (CQI/PMI) and data information are successively divided into the control information logic units and the data information logic units, and the truncated feedback information coded is sequentially divided into multiple feedback information logic units, and each logic unit has Qm bits. Afterwards, a virtual matrix is produced according to the total number of the feedback information logic units, the rank indication information logic units, the control information logic units and the data information logic units. When Normal Cyclic Prefix is configured for the subframe structure, the number of columns of the virtual matrix is set to be 12; and when Extended Cyclic Prefix is configured for the subframe structure, the number of columns of the virtual matrix is set to be 10.

(III) Step 406

Multiple feedback information logic units may be written into a reserved position of the virtual matrix as follows:

Method 1: when Normal Cyclic Prefix (Normal CP) is configured for the subframe structure, the feedback information logic units are written into virtual matrix columns with column number of 2, 3, 8 and 9 in the virtual matrix, i.e. the feedback information logic units are written into the third, fifth, tenth and twelfth symbols of the subframe; when Extended Cyclic Prefix (Extended CP) is configured for the subframe structure, the feedback information logic units are written into virtual matrix columns with column number of 1, 2, 6 and 7 in the virtual matrix, i.e. the feedback information logic units are written into the second, fourth, eighth and tenth symbols of the subframe. And writing is performed from the last row to the first row of the virtual matrix according to the sequence of rows first and then columns.

When Normal Cyclic Prefix is configured for the subframe structure, the rank indication information logic units are written into virtual matrix columns with column numbers of 1, 4, 7 and 10 in the virtual matrix, i.e. the feedback information logic units are written into the second, sixth, ninth and thirteenth symbols of the subframe; when Extended Cyclic Prefix is configured for subframe structure, the feedback information logic units are written into virtual matrix columns with column numbers of 0, 3, 5 and 8 in the virtual matrix, i.e. the feedback information logic units are written into the first, fifth, seventh and eleventh symbols of the subframe. And the writing is performed from the last row to the first row of the virtual matrix according to the sequence of rows first and then columns.

Subsequently, the control information logic units and the data information logic units are written in in due order from the position of the first row and first column of the virtual matrix according to the sequence of rows first and then columns. The feedback information logic units and the rank indication information logic units are skipped and the writing is continued from the next position.

Method 2: when Normal Cyclic Prefix is configured for subframe structure, the rank indication information logic units are written into virtual matrix columns with column numbers of 1, 4, 7 and 10 in the virtual matrix, i.e. the feedback information logic units are written into the second, sixth, ninth and thirteenth symbols of the subframe; when Extended Cyclic Prefix is configured for subframe structure, the feedback information logic units are written into virtual matrix columns with column numbers of 0, 3, 5 and 8 in the virtual matrix, i.e. the feedback information logic units are written into the first, fifth, seventh and eleventh symbols of the subframe. And the writing is performed from the last row to the first row of the virtual matrix according to the sequence of rows first and then columns.

Figure 5:
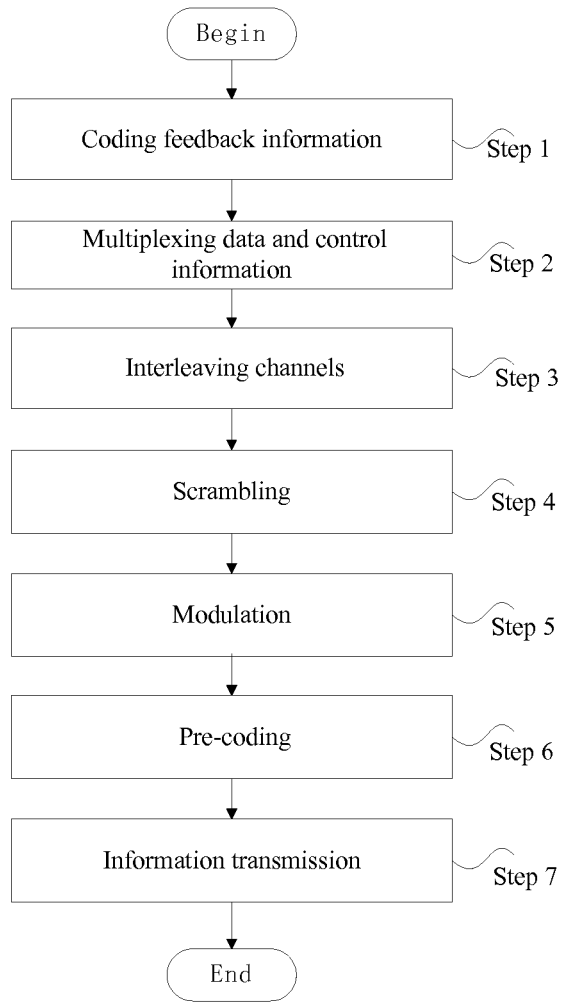
FIG. 5 is a detailed flow chart showing the process of carrying out the information multiplexing method according to one embodiment.

Subsequently, the control information logic units, the feedback information logic units, and the data information logic units are written in in due order from the position of the first row and first column of the virtual matrix according to the sequence of rows first and then columns. The rank indication information logic units are skipped and the writing is continued from the next position. Or the feedback information logic units, the control information logic units, and the data information logic units are written in in due order from the position of the first row and first column of the virtual matrix according to the sequence of rows first and then columns. The rank indication information logic units are skipped and the writing is continued from the next position. FIG. 5 is a detailed flow chart showing the process of carrying out the information multiplexing method according to one embodiment. As shown in FIG. 5, the embodiment comprises the following processes (steps 1 to 7).

Step 1, Coding the Feedback Information

ACK/NACK is set to be $o_0, o_1, \ldots, o_{O-1}$; wherein O represents the number of ACK/NACK, B is 32, $M_{i,n}$ is parameter. As shown in table 4, $b_0, b_1, b_2, b_3, \ldots, b_{B-1}$ is coded bit:

$$b_i = \sum_{n=0}^{O-1} (o_n \cdot M_{i,n}) \bmod 2;$$

wherein i=0, 1, 2, ..., B−1

The coded 32 bit information, which is obtained according to the above formula is repeated, and the coded information with a corresponding length is truncated according to target length of the coded transmission ACK/NACK.

Step 2, Multiplexing the Data and the Control Information

The coded uplink control information and the data information are sequentially divided into multiple uplink control information logic units and data information logic units according to the modulation schemes, and each logic unit has Qm bits. The above multiple uplink control information logic units and multiple data information logic units are made in series according to the sequence of the uplink control information logic units first and then the data information logic units.

Step 3, Interleaving Channels

The feedback information coded and rank indication information are sequentially divided into multiple feedback information logic units and multiple rank indication information logic units according to the modulation schemes, and each logic unit has Qm bits.

A virtual matrix is produced according to the total number of the feedback information logic units, the rank indication information logic units, the control information logic units and the data information logic units. When Normal Cyclic Prefix is configured for subframe structure, the number of columns of the virtual matrix is set to be 12; and when Extended Cyclic Prefix is configured for subframe structure, the number of columns of the virtual matrix is set to be 10.

Subsequently, the above multiple feedback information logic units are written into the above virtual matrix. When the system adopts the structure of Normal Cyclic Prefix, the feedback information logic units are written into the positions of virtual matrix columns with column numbers of 2, 3, 8 and 9 in the above virtual matrix, i.e. into the third, fifth, tenth and twelfth symbols of the subframe; when the system adopts the structure of Extended Cyclic Prefix, the feedback information logic units are written into the positions of virtual matrix columns with column numbers of 1, 2, 6 and 7 in the virtual matrix, i.e. in the second, fourth, eighth and tenth symbols of the subframe. Concretely, the writing is performed from the last row to the first row of the virtual matrix according to the sequence of rows first and then columns.

When Normal Cyclic Prefix is configured for subframe structure, the rank indication information logic units are written into virtual matrix columns with column numbers of 1, 4, 7 and 10 in the virtual matrix, i.e. the feedback information logic units are written into the second, sixth, ninth and thirteenth symbols of the subframe; when the Extended Cyclic Prefix is configured for subframe structure, the feedback information logic units are written into virtual matrix columns with column numbers of 0, 3, 5 and 8 in the virtual matrix, i.e. the feedback information logic units are written into the first, fifth, seventh and eleventh symbols of the subframe. And the writing is performed from the last row to the first row of the virtual matrix according to the sequence of rows first and then columns.

Then, the control information logic units and the data information logic units are written in in due order from the position of the first row and first column of the virtual matrix according to the sequence of rows first and then columns. The feedback information logic units and the rank indication information logic units are skipped and the writing is continued from the next position.

At last, logic units of all information are read out from the above virtual matrix according to the sequence of columns first and then rows.

Step 4, Scrambling

In the present embodiment, scrambling method in LTE standard in the existing technologies can be realized.

Step 5, Modulation

Modulation schemes may be QPSK, 16QAM and 64QAM; wherein feedback information and data information have same modulation schemes.

Step 6, Pre-Coding

Modulation symbols are sequentially divided into aggregates; wherein the number of the modulation symbols in each of the aggregates is equal to the size of occupied frequency domain resource, and Discrete Fourier Transformation (DFT) is performed to all of the modulation symbols of each of the aggregates.

Step 7, Information Transmission

Data to which DFT is performed is mapped onto corresponding physical time frequency resource, and then is transmitted.

Embodiment 2

Figure 6:
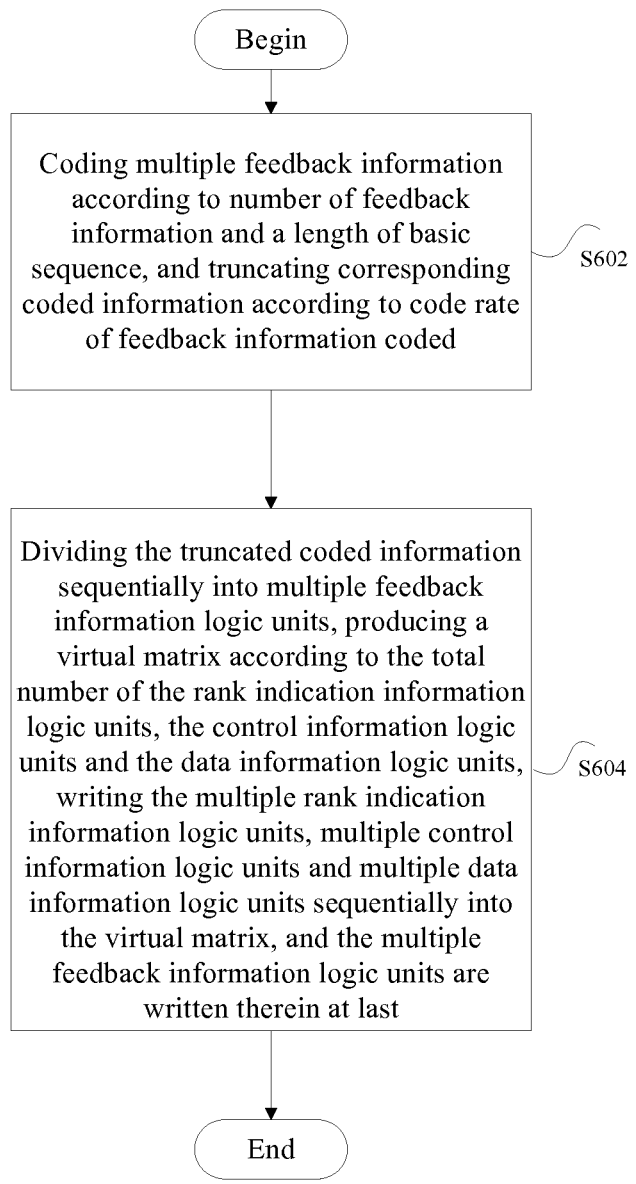
FIG. 6 is a flow chart showing the information multiplexing method according to embodiment 2.

FIG. 6 is a flow chart showing the information multiplexing method according to embodiment 2. As shown in FIG. 6, the information multiplexing method according to the present embodiment comprises the following processes (steps 602 to 604):

Step 602, coding multiple feedback information according to number of the feedback information and the length of the basic sequence, and truncating corresponding coded information according to the target length of the feedback information coded.

Step 604, dividing the truncated coded information into multiple feedback information logic units sequentially. Producing a virtual matrix according to the total number of the rank indication information logic units, the control information logic units and the data information logic units. Writing the multiple rank indication information logic units, multiple control information logic units and multiple data information logic units sequentially into the virtual matrix, and writing the multiple feedback information logic units therein at last; wherein the control information logic units, the data information logic units, the feedback information logic units, and the rank indication information logic units have the same bit number, and logic units of other information written into positions occupied by the feedback information logic units are not transmitted any more.

Transmission of more than two ACK/NACKs can be achieved according to the embodiments of the present invention to improve transmission performance of the system.

The above processes will be described in details as follows.

(I) Step 602

This step is the same as that in step 402, and therefore not described here again.

(II) Step 604

A virtual matrix is produced according to the total number of the rank indication information logic units, the control information logic units and the data information logic units; wherein when Normal Cyclic Prefix is configured for subframe structure, the number of columns of the virtual matrix is set to be 12; and when Extended Cyclic Prefix is configured for subframe structure, the number of the columns of the virtual matrix is set to be 10.

When t Normal Cyclic Prefix is configured for subframe structure, the rank indication information logic units are written into virtual matrix columns with column numbers of 1, 4, 7 and 10 in the virtual matrix, i.e. the feedback information logic units are written into the second, sixth, ninth and thirteenth symbols of the subframe; when the Extended Cyclic Prefix is configured for subframe structure, the feedback information logic units are written into virtual matrix columns with column numbers of 0, 3, 5 and 8 in the virtual matrix, i.e. the feedback information logic units are written into the first, fifth, seventh and eleventh symbols of the subframe. And the writing is performed from the last row to the first row of the virtual matrix according to the sequence of rows first and then columns.

The control information logic units and the data information logic units are written in in due order from the position of the first row and first column of the virtual matrix according to the sequence of rows first and then columns. The rank indication information logic units are skipped and the writing is continued from the next position.

When Normal Cyclic Prefix is configured for subframe structure, the feedback information logic units are written into virtual matrix columns with column numbers of 2, 3, 8 and 9 in the virtual matrix, i.e. the feedback information logic units are written in the third, fifth, tenth and twelfth symbols of the subframe; when Extended Cyclic Prefix is configured for subframe structure, the feedback information logic units are written into virtual matrix columns with column numbers of 1, 2, 6 and 7 in the virtual matrix, i.e. the feedback information logic units are written into the second, fourth, eighth and tenth symbols of the subframe. And the writing is performed from the last row to the first row of the virtual matrix according to the sequence of rows first and then columns; wherein the logic units of other information written into positions occupied by the feedback information logic units are not transmitted any more.

Embodiment 2 will be further described in combination with FIG. 5.

Step 1, Coding

ACK/NACK is set to be $o_0, o_1, \ldots, o_{O-1}$; wherein O represents the number of ACK/NACK, B is 20, $M_{i,n}$ is parameter. As shown in table 3, $b_0, b_1, b_2, b_3, \ldots, b_{B-1}$ is coded bit:

$$b_i = \sum_{n=0}^{O-1} (o_n \cdot M_{i,n}) \bmod 2;$$

wherein i=0, 1, 2, ..., B−1

The coded 20 bit information, which is obtained according to the above formula is repeated, and the coded information of corresponding length is truncated according to target length of the coded transmission ACK/NACK.

Step 2, Multiplexing the Data and the Control Information

The truncated uplink control information and the data information after coding are sequentially divided into multiple control information logic units and data information logic units according to modulation methods; wherein each logic unit has Qm bits.

Step 3, Interleaving Channels

The feedback information coded and rank indication information are sequentially divided into multiple feedback information logic units and multiple rank indication information logic units according to the modulation schemes, and each logic unit has Qm bits.

A virtual matrix is produced according to the total number of the rank indication information logic units, the control information logic units and the data information logic units.

When Normal Cyclic Prefix is configured for subframe structure, the rank indication information logic units are written into virtual matrix columns with column numbers of 1, 4, 7 and 10 in the virtual matrix, i.e. the feedback information logic units are written in the second, sixth, ninth and thirteenth symbols of the subframe; when Extended Cyclic Prefix is configured for subframe structure, the feedback information logic units are written into virtual matrix columns with column numbers of 0, 3, 5 and 8 in the virtual matrix, i.e. the feedback information logic units are written in the first, fifth, seventh and eleventh symbols of the subframe. And the writing is performed from the last row to the first row of the virtual matrix according to the sequence of rows first and then columns.

The control information logic units and the data information logic units are written in in due order from the position of the first row and first column of the virtual matrix according to the sequence of rows first and then columns. The rank indication information logic units are skipped, and the writing is continued from the next position.

When Normal Cyclic Prefix is configured for subframe structure, the feedback information logic units are written into virtual matrix columns with column numbers of 2, 3, 8 and 9 in the virtual matrix, i.e. the feedback information logic units are written into the third, fifth, tenth and twelfth symbols of the subframe; when Extended Cyclic Prefix is configured for subframe structure, the feedback information logic units are written into virtual matrix columns with column numbers of 1, 2, 6 and 7 in the virtual matrix, i.e. the feedback information logic units are written into the second, fourth, eighth and tenth symbols of the subframe. And the writing is performed from the last row to the first row of the virtual matrix according to the sequence of rows first and then columns; wherein the logic units of other information written in positions occupied by the feedback information logic units are not transmitted any more.

At last, logic units of all information are read out from the above virtual matrix according to the sequence of columns first and then rows.

Step 4, Scrambling

In the present embodiment, scrambling method in LTE standard in the existing technologies can be realized.

Step 5, Modulation

Modulation schemes may be QPSK, 16QAM and 64QAM; wherein feedback information and data information have same modulation schemes.

Step 6, Pre-Coding

Modulation symbols are sequentially divided into aggregates; wherein the number of the modulation symbols in each of the aggregates is equal to the size of occupied frequency domain resource and DFT is performed to all of the modulation symbols of each of the aggregates.

Step 7, Information Transmission

Data to which DFT is performed is mapped onto corresponding physical time frequency resource, and then is transmitted.

Embodiment 3

Figure 7:
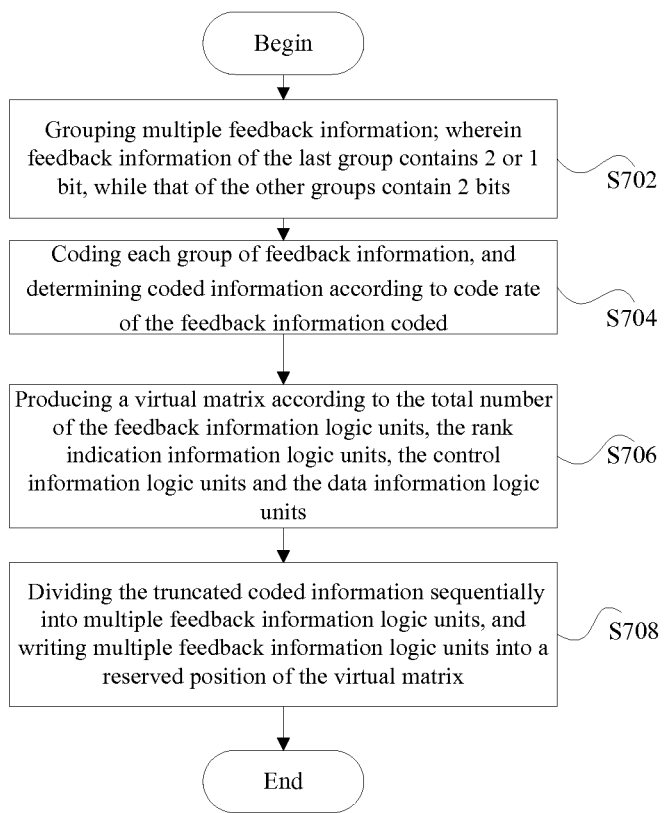
FIG. 7 is a flow chart showing the information multiplexing method according to embodiment 3.

FIG. 7 is a flow chart showing the information multiplexing method according to embodiment 3. As shown in FIG. 7, the information multiplexing method according to the present embodiment comprises the following processes (steps 702 to 708):

Step 702, grouping multiple feedback information; wherein the feedback information of the last group comprises 2 or 1 bit, while the other groups comprise 2 bits;

Step 704, coding each group of the feedback information, and determining coded information according to the target length of the feedback information coded.

Step 706, producing a virtual matrix according to the total number of the feedback information logic units, the rank indication information logic units, the control information logic units and the data information logic units;

Step 708, dividing the truncated coded information into multiple feedback information logic units sequentially, and writing the multiple feedback information logic units into a reserved position of the virtual matrix; wherein the control information logic units, the data information logic units, the feedback information logic units, and the rank indication information logic units have the same bit number.

Transmission of more than two ACK/NACKs can be achieved according to the embodiments of the present invention to improve transmission performance of the system.

The processes of carrying out the above steps will be described in details as follows.

(I) Step 702

Feedback information is grouped in due order. When the number of the feedback information is even, each group of the feedback information comprises 2 bits, while when the number of the feedback information number is odd, the feedback information of the last group contains only 1 bit, and that of the other groups contains 2 bits.

(II) Step 704

Coding is performed according to bit number of each group of feedback information as shown in tables 5 and 6; wherein table 5 shows the coding method when feedback information is 1 bit, while table 6 shows the coding method when feedback information is 2 bits, Qm represents the modulation method, 2 represents QPSK, 4 represents 16QAM and 6 represents 64QAM.

TABLE 5 coding of 1 bit ACK/NACK

| $Q_m$ | Encoded RI |
|---|---|
| 2 | $[o_0^{RI}\ x]$ |
| 4 | $[o_0^{RI}\ x\ x\ x]$ |
| 6 | $[o_0^{RI}\ x\ x\ x\ x\ x]$ |

TABLE 6 coding of 2 bit ACK/NACK

| $Q_m$ | Encoded RI |
|---|---|
| 2 | $[o_0^{RI}\ o_1^{RI}\ o_2^{RI}\ o_0^{RI}\ o_1^{RI}\ o_2^{RI}]$ |
| 4 | $[o_0^{RI}\ o_1^{RI}\ x\ x\ o_2^{RI}\ o_0^{RI}\ x\ x\ o_1^{RI}\ o_2^{RI}\ x\ x]$ |
| 6 | $[o_0^{RI}\ o_1^{RI}\ x\ x\ x\ x\ o_2^{RI}\ o_0^{RI}\ x\ x\ x\ x\ o_1^{RI}\ o_2^{RI}\ x\ x\ x\ x]$ |

In table 6, $o_2^{RI}=(o_0^{RI}+o_1^{RI})$ mod2, and "x" is a special character representing placeholder for scrambling.

After truncated coded information is determined, the coded information can be interleaved, and the interleaved information is sequentially divided into multiple feedback information logic units. Interleaving may be performed in the manner of row in column out; wherein when intra-group feedback information is 1 bit, in case that the modulation scheme is QPSK, a length of the column is 2; in case that the modulation scheme is 16QAM, the length of the column is 4; in case that the modulation scheme is 64QAM, the length of the column is 8. When the intra-group feedback information is 2 bit, in case that the modulation scheme is QPSK, the length of the column is 6; in case that the modulation scheme is 16QAM, the length of the column is 12; in case that the modulation scheme is 64QAM, the length of the column is 18. Or the length of the column is set to be a fixed value, which comprises one of the followings: 2, 4, 6 or 8.

(III) Step 706

This step is the same as that in step 404, and therefore not described here again.

(IV) Step 708

This step is the same as that in step 406, and therefore not described here again.

Embodiment 3 will be further described in combination with FIG. 5.

ACK/NACK is grouped in due order; wherein the last group may contain 1 or 2 bits, while the other groups contain 2 bits. Coding is performed according to bit number of each group of ACK/NACK as shown in tables 5 and 6.

The above ACK/NACK is repeated, and coded information of corresponding length is truncated according to target length of transmission coded ACK/NACK.

Step 2, Multiplexing the Data and the Control Information

The coded uplink control information and the data information are sequentially divided into multiple uplink control information logic units and data information logic units according to the modulation schemes, and each logic unit has Qm bits. The above multiple uplink control information logic units and data information logic units are made in series according to the sequence of uplink control information logic units first and then data information logic units.

Step 3, Interleaving Channels

The feedback information coded and rank indication information are sequentially divided into multiple feedback information logic units and multiple rank indication information logic units according to the modulation schemes and each logic unit has Qm bits.

A virtual matrix is produced according to the total number of the feedback information logic units, the rank indication information logic units, the control information logic units and the data information logic units. When Normal Cyclic Prefix is configured for subframe structure, the number of columns of the virtual matrix is set to be 12; and when Extended Cyclic Prefix is configured for subframe structure, the number of columns of the virtual matrix is set to be 10.

Subsequently, the above multiple feedback information logic units are written into the above virtual matrix. When the system adopts the structure of Normal Cyclic Prefix, the feedback information logic units are written into positions of virtual matrix columns with column numbers of 2, 3, 8 and 9 into the above virtual matrix, i.e. in the third, fifth, tenth and twelfth symbols of the subframe; when the system adopts the structure of Extended Cyclic Prefix, the feedback information logic units are written into positions of virtual matrix columns with column numbers of 1, 2, 6 and 7 in the virtual matrix, i.e. in the second, fourth, eighth and tenth symbols of the subframe. Concretely, the writing is performed from the last row to the first row of the virtual matrix according to the sequence of rows first and then columns.

When Normal Cyclic Prefix is configured for subframe structure, the rank indication information logic units are written into virtual matrix columns with column numbers of 1, 4, 7 and 10 in the virtual matrix, i.e. the feedback information logic units are written in the second, sixth, ninth and thirteenth symbols of the subframe; when Extended Cyclic Prefix is configured for subframe structure, the feedback information logic units are written into virtual matrix columns with column numbers of 0, 3, 5 and 8 in the virtual matrix, i.e. the feedback information logic units are written into the first, fifth, seventh and eleventh symbols of the subframe. And the writing is performed from the last row to the first row of the virtual matrix according to the sequence of rows first and then columns.

Then, the control information logic units and the data information logic units are written in in due order from the position of the first row and first column of the virtual matrix according to the sequence of rows first and then columns. The feedback information logic units and the rank indication information logic units are skipped, and the writing is continued from the next position.

At last, logic units of all information are read out from the above virtual matrix according to the sequence of columns first and then rows.

Step 4, Scrambling

In the present embodiment, scrambling method in LTE standard in the existing technologies can be realized.

Step 5, Modulation

Modulation schemes may be QPSK, 16QAM and 64QAM; wherein feedback information and data information have same modulation schemes.

Step 6, Pre-Coding

Modulation symbols are sequentially divided into aggregates. The number of the modulation symbols in each of the aggregates is equal to the size of occupied frequency domain resource, and DFT is performed to all of the modulation symbols of each of the aggregates.

Step 7, Information Transmission

Data to which DFT is performed is mapped onto corresponding physical time frequency resource, and then is transmitted.

Embodiment 4

Figure 8:
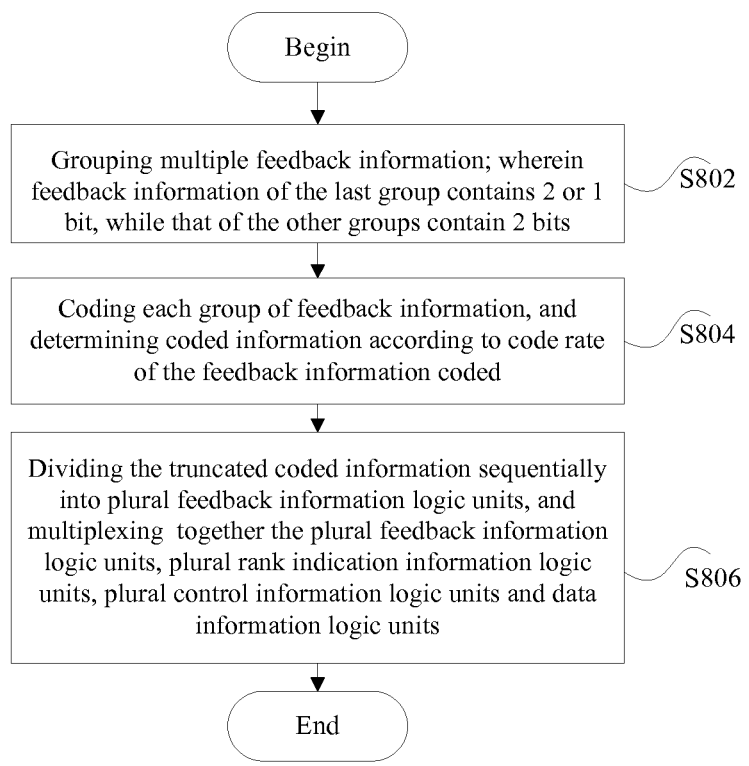
FIG. 8 is a flow chart showing the information multiplexing method according to embodiment 4.

FIG. 8 is a flow chart showing the information multiplexing method according to embodiment 4. As shown in FIG. 8, the information multiplexing method according to the present embodiment comprises the following processes (steps 802 to 806):

Step 802, grouping multiple feedback information; wherein the feedback information of the last group contains 2 or 1 bit, while that of the other groups contain 2 bits.

Step 804, coding each of the feedback information, and determining coded information according to target length of the feedback information coded.

Step 806, dividing the truncated coded information sequentially into multiple feedback information logic units, and multiplexing together the multiple feedback information logic units, multiple rank indication information logic units, multiple control information logic units and data information logic units; wherein the control information logic units, the data information logic units, the feedback information logic units, and the rank indication information logic units contain the same bit number.

Transmission of more than two ACK/NACKs can be achieved according to the embodiments of the present invention to improve transmission performance of the system.

As being similar with steps 402 to 406, steps 802 to 806 are not described again here.

Embodiment 4 will be further described in combination with FIG. 5.

Step 1, Coding the Feedback Information

ACK/NACK is grouped in due order; wherein the last group may contain 1 or 2 bits, while the other groups contain 2 bits. Coding is performed according to bit number of each group of ACK/NACK as shown in tables 5 and 6.

The above ACK/NACK is repeated, and coded information of corresponding length is truncated according to target length of transmission coded ACK/NACK.

Step 2, Multiplexing the Data and the Control Information

The truncated coded uplink control information and the data information are sequentially divided into multiple control information logic units and multiple data information logic units according to the modulation schemes; wherein each logic unit contains Qm bits, and the above multiple control information logic units and multiple data information logic units are made in series according to the sequence of the uplink control information first and then the data information.

Step 3, Interleaving Channels

The feedback information coded and rank indication information are sequentially divided into multiple feedback information logic units and multiple rank indication information logic units according to the modulation schemes, and each logic unit contains Qm bits.

A virtual matrix is produced according to the total number of the rank indication information logic units, the control information logic units and the data information logic units.

When Normal Cyclic Prefix is configured for subframe structure, the rank indication information logic units are written into virtual matrix columns with column numbers of 1, 4, 7 and 10 in the virtual matrix, i.e. the feedback information logic units are written into the second, sixth, ninth and thirteenth symbols of the subframe; when is configured for subframe structures, the feedback information logic units are written into virtual matrix columns with column numbers of 0, 3, 5 and 8 in the virtual matrix, i.e. the feedback information logic units are written into the first, fifth, seventh and eleventh symbols of the subframe. And the writing is performed from the last row to the first row of the virtual matrix according to the sequence of rows first and then columns.

Then, the control information logic units and the data information logic units are written in in due order from the position of the first row and first column of the virtual matrix according to the sequence of rows first and then columns. The rank indication information logic units are skipped, and the writing is continued from the next position.

When Normal Cyclic Prefix is configured for subframe structure, the feedback information logic units are written into virtual matrix columns with column numbers of 2, 3, 8 and 9 in the virtual matrix, i.e. the feedback information logic units are written into the third, fifth, tenth and twelfth symbols of the subframe; when Extended Cyclic Prefix is configured for subframe structure, the feedback information logic units are written into virtual matrix columns with column numbers of 1, 2, 6 and 7 in the virtual matrix, i.e. the feedback information logic units are written into the second, fourth, eighth and tenth symbols of the subframe. And the writing is performed from the last row to the first row of the virtual matrix according to the sequence of rows first and then columns; wherein logic units of other information written in positions occupied by the feedback information logic units are not transmitted any more.

At last, logic units of all information are read out from the above virtual matrix according to the sequence of columns first and then rows.

Step 4, Scrambling

In the present embodiment, scrambling method in LTE standard in the existing technologies can be realized.

Step 5, Modulation

Modulation schemes may be QPSK, 16QAM and 64QAM; wherein feedback information and data information have same modulation schemes.

Step 6, Pre-Coding

Modulation symbols are sequentially divided into aggregates; wherein the number of the modulation symbols in each of the aggregates is equal to the size of occupied frequency domain resource, and DFT is performed to all of the modulation symbols of each of the aggregates.

Step 7, Information Transmission

Data to which DFT is performed is mapped onto corresponding physical time frequency resource, and then is transmitted.

As stated above, transmission of more than two ACK/NACKs is achieved by coding multiple ACK/NACKs and writing them into the corresponding matrix for transmission according to the information multiplexing method provided in the present invention so that problem of transmitting multiple ACK/NACKs in physical uplink shared channel can be solved, base station is ensured to receive ACK/NACK of downlink data feedbacked by target users, and transmission performance of the system is improved.

The present invention has been shown with reference to the above-described embodiments, and it is not to be limited by the above embodiments. It is understood by those skilled in the art various alterations and changes may be made within the spirit and scope of the invention. All modifications, substitute equivalents or improvements made therein are intended to be embraced in the claims of this invention.

What is claimed is:

1. An information multiplexing method, comprising:

initiating from a mobile terminal, coding multiple feedback information according to number of the feedback information and a linear block code sequence, and truncating corresponding coded information according to a target length of the feedback information coded;

dividing the truncated coded information into multiple feedback information logic units sequentially, and multiplexing together the multiple feedback information logic units, multiple rank indication information logic units, multiple control information logic units and data information logic units; wherein the number of bits in the control information logic unit, the multiple rank indication information logic unit, the data information logic units, and the feedback information logic unit is the same.

2. The method according to claim 1, wherein the step of coding multiple feedback information according to number of the feedback information and a linear block code sequence comprises:
   coding the multiple feedback information according to the number of the feedback information and a length of a basic sequence; or
   grouping the multiple feedback information; wherein the feedback information of the last group has 2 or 1 bit, while the other groups have 2 bits; and coding each group of the feedback information.

3. The method according to claim 2, wherein the step of coding the multiple feedback information according to number of the feedback information and a length of basic sequence comprises:

$$b_i = \sum_{n=0}^{O-1} (o_n \cdot M_{i,n}) \bmod 2;$$

wherein i=0, 1, 2, ..., B−1, $b_0,b_1,b_2,b_3,...,b_{B-1}$ represents a coded bit sequence, O represents the number of the feedback information, B represents the length of the basic sequence, $M_{i,n}$ represents value of number i in the basic sequence n, and $o_0, o_1, ..., o_{O-1}$ represents the feedback information.

4. The method according to claim 3, wherein the step of truncating corresponding coded information according to a target length of the feedback information coded comprises:
   repeating the coded bit to acquire a reference bit; truncating the coded information whose length is the same as the target length of the feedback information coded from the reference bit; or
   repeating the coded bit to obtain the coded information according to the target length of the feedback information coded.

5. The method according to claim 3, wherein the basic sequence comprises:
   in the case of B=20, 0≦i≦19, 0≦n≦12, the matrix corresponding to $M_{i,n}$ is:

$$\begin{bmatrix} 1 1 0 0 0 0 0 0 0 1 1 0 \\ 1 1 1 0 0 0 0 0 1 1 1 0 \\ 1 0 0 1 0 0 1 0 1 1 1 1 1 \\ 1 0 1 1 0 0 0 0 1 0 1 1 1 \\ 1 1 1 1 0 0 0 1 0 0 1 1 1 \\ 1 1 0 0 1 0 1 1 1 0 1 1 1 \\ 1 0 1 0 1 0 1 0 1 1 1 1 1 \\ 1 0 0 1 1 0 0 1 1 0 1 1 1 \\ 1 1 0 1 1 0 0 1 0 1 1 1 1 \\ 1 0 1 1 1 0 1 0 0 1 1 1 1 \\ 1 0 1 0 0 1 1 1 0 1 1 1 1 \\ 1 1 1 0 0 1 1 0 1 0 1 1 1 \\ 1 0 0 1 0 1 0 1 1 1 1 1 1 \\ 1 1 0 1 0 1 0 1 0 1 1 1 1 \\ 1 0 0 0 1 1 0 1 0 0 1 0 1 \\ 1 1 0 0 1 1 1 1 0 1 1 0 1 \\ 1 1 1 0 1 1 1 0 0 1 0 1 1 \\ 1 0 0 1 1 1 0 0 1 0 0 1 1 \\ 1 1 0 1 1 1 1 1 0 0 0 0 0 \\ 1 0 0 0 0 1 1 0 0 0 0 0 0 \end{bmatrix};$$

or,
in the case of B=32, 0≦i≦31, 0≦n≦10, the matrix corresponding to $M_{i,n}$ is:

$$\begin{bmatrix} 1 1 0 0 0 0 0 0 0 0 1 \\ 1 1 1 0 0 0 0 0 0 1 1 \\ 1 0 0 1 0 0 1 0 1 1 1 \\ 1 0 1 1 0 0 0 0 1 0 1 \\ 1 1 1 1 0 0 0 1 0 0 1 \\ 1 1 0 0 1 0 1 1 1 0 1 \\ 1 0 1 0 1 0 1 0 1 1 1 \\ 1 0 0 1 1 0 0 1 1 0 1 \\ 1 1 0 1 1 0 0 1 0 1 1 \\ 1 0 1 1 1 0 1 0 0 1 1 \\ 1 0 1 0 0 1 1 1 0 1 1 \\ 1 1 1 0 0 1 1 0 1 0 1 \\ 1 0 0 1 0 1 0 1 1 1 1 \\ 1 1 0 1 0 1 0 1 0 1 1 \\ 1 0 0 0 1 1 0 1 0 0 1 \\ 1 1 0 0 1 1 1 1 0 1 1 \\ 1 1 1 0 1 1 1 0 0 1 0 \\ 1 0 0 1 1 1 0 0 1 0 0 \\ 1 1 0 1 1 1 1 1 0 0 0 \\ 1 0 0 0 0 1 1 0 0 0 0 \\ 1 0 1 0 0 0 1 0 0 0 1 \\ 1 1 0 1 0 0 0 0 0 1 1 \\ 1 0 0 0 1 0 0 1 1 0 1 \\ 1 1 1 0 1 0 0 0 1 1 1 \\ 1 1 1 1 1 0 1 1 1 1 0 \\ 1 1 0 0 0 1 1 1 0 0 1 \\ 1 0 1 1 0 1 0 0 1 1 0 \\ 1 1 1 1 0 1 0 1 1 1 0 \\ 1 0 1 0 1 1 1 0 1 0 0 \\ 1 0 1 1 1 1 1 1 1 0 0 \\ 1 1 1 1 1 1 1 1 1 1 1 \\ 1 0 0 0 0 0 0 0 0 0 0 \end{bmatrix}.$$

6. The method according to claim 2, wherein the step of coding each group of the feedback information comprises:
   when intra-group feedback information is 1 bit, in case that modulation scheme is QPSK, the coded information is $[O_0,x]$; in case that the modulation scheme is 16QAM, the coded information is $[O_0,x,x,x]$; in case that the modulation scheme is 64QAM, the coded information is $[O_0,x,x,x,x,x]$; wherein $O_0$ represents the feedback information;
   when the intra-group feedback information is 2 bits, in case that the modulation scheme is QPSK, the coded information is $[O_0,O_1,O_2,O_0,O_1,O_2]$ in case that the modulation scheme is 16QAM, the coded information is $[O_0, O_1,x,x,O_2,O_0,x,x,O_1O_2,x,x]$; in case that the modulation scheme is 64QAM, the coded information is $[O_0, O_{1,x,x,x,x,O2},O_0,x,x,x,x,O_1,O_2,x,x,x,x]$; wherein $O_0$, $O_1$ represent the feedback information and $o_2=(o_{0\oplus o1})$, $\oplus$ represents module operations, x represent placeholders for scrambling.

7. The method according to claim 6, wherein the step of dividing the truncated coded information into multiple feedback information logic units sequentially comprises:
   interleaving the truncated coded information, and sequentially dividing the interleaved information into multiple the feedback information logic units.

8. The method according to claim 7, wherein the step of interleaving the truncated coded information comprises:
   interleaving the truncated coded information in a manner of row in column out; wherein when the intra-group feedback information is 1 bit, in case that the modulation scheme is QPSK, a length of the column is 2; in case that the modulation scheme is 16QAM, the length of the column is 4; in case that the modulation scheme is 64QAM, the length of the column is 8; when the intra-group feedback information is 2 bits, in case that the modulation scheme is QPSK, the length of the column is 6; in case that the modulation scheme is 16QAM, the length of the column is 12; in case that the modulation scheme is 64QAM, the length of the column is 18; or setting the length of the column to be a fixed value; wherein, the fixed value comprises one of the followings: 2, 4, 6 or 8.

9. The method according to claim 1, wherein the step of multiplexing together the multiple feedback information logic units, multiple rank indication information logic units, multiple control information logic units and data information logic units comprises:

producing a virtual matrix according to total number of the feedback information logic units, the rank indication information logic units, the control information logic units and the data information logic units;

writing, according to a sequence of writing in rows first and then columns of the virtual matrix, from a last row to a first row of the virtual matrix, the feedback information logic units and the rank indication information logic units into a reserved position of the virtual matrix;

writing in, from a position of the first row and a first column of the virtual matrix, according to the sequence of rows first and then columns, the control information logic units and the data information logic units in due order; wherein positions in which the feedback information logic units and the rank indication information logic units are written are skipped.

10. The method according to claim 9, wherein the step of writing the multiple feedback information logic units in a reserved position of the matrix comprises:

when Normal Cyclic Prefix is configured for subframe structure, writing the feedback information logic units into matrix columns with column numbers of 2, 3, 8 and 9 in the matrix;

when Extended Cyclic Prefix is configured for subframe structure, writing the feedback information logic units in matrix columns with column numbers of 1, 2, 6 and 7 in the matrix;

wherein the columns of the matrix are numbered from 0.

11. The method according to claim 1, wherein the step of multiplexing together the multiple feedback information logic units, multiple rank indication information logic units, multiple control information logic units and data information logic units comprises:

producing a virtual matrix according to total number of the feedback information logic units, the rank indication information logic units, the control information logic units and the data information logic units;

writing, according to a sequence of writing in rows first and then columns of the virtual matrix, from a last row to a first row of the virtual matrix, the rank indication information logic unit in a reserved position of the virtual matrix;

writing in, from a position of the first row and a first column of the virtual matrix, according to the sequence of writing in rows first and then columns of the matrix, the control information logic units, the feedback information logic units and the data information logic units in due order; wherein positions in which the feedback information logic units and the rank indication information logic units are written are skipped; or, writing in, from the position of the first row and the first column of the virtual matrix, according to the sequence of writing in rows first and then columns of the matrix, the feedback information logic units, the control information logic units, and the data information logic units in due order; wherein positions in which the feedback information logic units and the rank indication information logic units are written are skipped.

12. The method according to claim 1, wherein the step of multiplexing together the multiple feedback information logic units, multiple rank indication information logic units, multiple control information logic units and data information logic units comprises:

producing a virtual matrix according to total number of the rank indication information logic units, the control information logic units and the data information logic units;

writing, according to a sequence of writing in rows first and then columns of the matrix, from a last row to a first row of the virtual matrix, the rank indication information logic units in a first reserved position of the virtual matrix;

writing in, from a position of the first row and a first column of the virtual matrix, according to the sequence of writing in rows first and then columns of the matrix, the control information logic units and the data information logic units in due order; wherein positions in which the rank indication information logic units are written are skipped;

writing, according to the sequence of writing in rows first and then columns of the matrix, the feedback information logic units in a second reserved position of the virtual matrix, and transmitting no other information logic units in the condition that the second reserved position has been occupied by the other information logic units.

13. The method according to claim 12, wherein the step of writing the multiple feedback information logic units in the reserved position of the matrix comprises:

when Normal Cyclic Prefix is configured for subframe structure, writing the feedback information logic units into matrix columns with column numbers of 2, 3, 8 and 9 in the matrix;

when Extended Cyclic Prefix is configured for subframe structure, writing the feedback information logic units into matrix columns with column numbers of 1, 2, 6 and 7 in the matrix;

wherein the columns of the matrix are numbered from 0, and the writing is performed from the last row to the first row of the matrix.

14. The method according to claim 12, wherein the step of writing the multiple feedback information logic units in the second reserved position of the virtual matrix comprises:

writing in the feedback information logic units from a position where the first data information logic unit is located; or, writing in the feedback information logic units from a position where the first control information logic unit is located; wherein the positions in which the rank indication information logic units are written are skipped.

15. The method according to claim 9, wherein, when Normal Cyclic Prefix is configured for subframe structure, the number of columns of the matrix is set to be 12; and when =Extended Cyclic Prefix is configured for subframe structure, the number of columns of the matrix is set to be 10.

16. The method according to claim 1, wherein the feedback information comprises one of the followings: Acknowledgement and Negative Acknowledgement.

17. The method according to claim 1, wherein the control information logic units, the data information logic units, and the feedback information logic units having the same bit numbers comprises:
   in case that the modulation scheme is QPSK, the bit number is 2; in case that the modulation scheme is 16QAM, the bit number is 4; in case that the modulation scheme is 64QAM, the bit number is 6.

18. The method according to claim 1, wherein the number of the multiple feedback information is an integer more than 2.

19. The method according to claim 11, wherein,
   when Normal Cyclic Prefix is configured for subframe structure, the number of columns of the matrix is set to be 12; and
   when =Extended Cyclic Prefix is configured for subframe structure, the number of columns of the matrix is set to be 10.

20. The method according to claim 12, wherein,
   when Normal Cyclic Prefix is configured for subframe structure, the number of columns of the matrix is set to be 12; and
   when =Extended Cyclic Prefix is configured for subframe structure, the number of columns of the matrix is set to be 10.

\* \* \* \* \*

UNITED STATES PATENT AND TRADEMARK OFFICE
CERTIFICATE OF CORRECTION

PATENT NO. : 8,537,752 B2  
APPLICATION NO. : 13/057722  
DATED : September 17, 2013  
INVENTOR(S) : Bo Dai et al.

Page 1 of 1

It is certified that error appears in the above-identified patent and that said Letters Patent is hereby corrected as shown below:

In the Claims:

Column 21, Claim 5, Line 42, reads: "...to $M_{l,\,n}$ is:"

It should read: "...to $M_{i,n}$ is:"

Column 21, Claim 5, Line 67, reads: "...to $M_{l,\,n}$ is:"

It should read: "...to $M_{i,n}$ is:"

Signed and Sealed this  
Third Day of December, 2013

Margaret A. Focarino  
*Commissioner for Patents of the United States Patent and Trademark Office*